United States Patent [19]

Nossen

[11] Patent Number: 4,652,838

[45] Date of Patent: Mar. 24, 1987

[54] PHASE RANDOMIZATION TO REDUCE DETECTABILITY OF PHASE OR FREQUENCY-MODULATED DIGITAL SIGNALS

[75] Inventor: Edward J. Nossen, Cherry Hill, N.J.

[73] Assignee: RCA Corporation, Princeton, N.J.

[21] Appl. No.: 724,309

[22] Filed: Apr. 17, 1985

[51] Int. Cl.$^4$ .................................. H04K 1/00
[52] U.S. Cl. .......................... 380/6; 342/60; 332/18; 380/31
[58] Field of Search ............. 332/9 R, 18, 21; 455/26, 28, 30; 343/7.6, 17.5; 178/22.01

[56] References Cited

U.S. PATENT DOCUMENTS

| | | | |
|---|---|---|---|
| 3,617,892 | 11/1971 | Hawley | 325/145 |
| 4,179,657 | 12/1979 | Hobbs | 325/33 |
| 4,206,462 | 6/1980 | Rabow | 343/7.6 |
| 4,324,002 | 4/1982 | Spilker Jr. | 455/27 |

Primary Examiner—Eugene R. LaRoche
Assistant Examiner—Robert J. Pascal
Attorney, Agent, or Firm—Joseph S. Tripoli; Robert L. Troike; William H. Meise

[57] ABSTRACT

A communications system for conveying information angle-modulated onto a carrier includes a modulator which angle-modulates the data onto the carrier and which also randomly changes the phase of the carrier. Since the carrier phase is randomly changed, an unauthorized receiver or interceptor of the signal who frequency-multiplies the signal and integrates over a long period in order to reconstruct the carrier produces a carrier which has a broader bandwidth and relatively less amplitude than in the case in which the carrier phase is not randomly changed. The probability of intercept and demodulation by the unauthorized receiver is thereby reduced. The authorized receiver frequency-multiplies and integrates for the known frame interval to recover the carrier.

20 Claims, 21 Drawing Figures

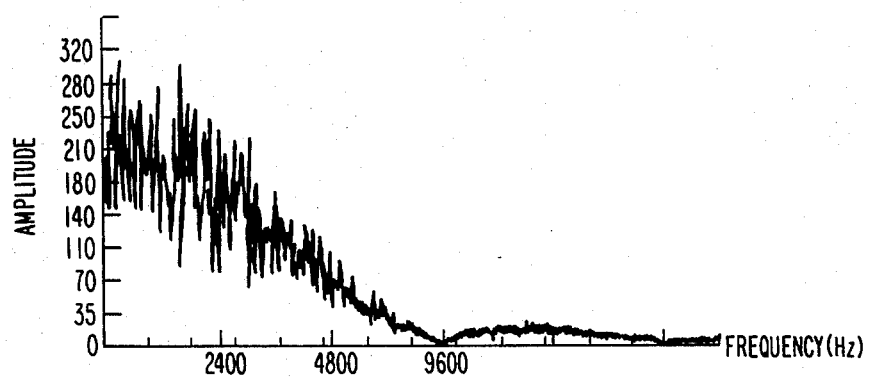
Fig. 2 BASEBAND SPECTRUM
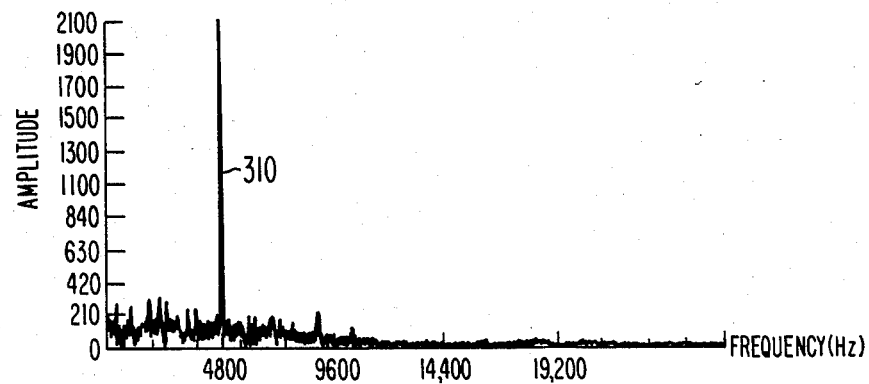
Fig. 3 FREQUENCY DOUBLED BASEBAND SPECTRUM

Fig. 11a

| ACTIVE BITS | DEAD TIME BITS | PERFORMANCE LOSS (DB) | DATA RATE B/S | CHIP RATE C/S | FRAME DURATION MS | DEAD TIME MS |
|---|---|---|---|---|---|---|
| 64 | 4 | 0.26 | 2400 | 2550 | 26.67 | 1.57 |
| 64 | 4 | 0.26 | 9600 | 10200 | 6.67 | 0.39 |

Fig. 11b

BANDWIDTH EFFICIENCY (HERTZ/CHIP)

| MODULATION | WAVEFORM | ENERGY BANDWIDTH | | | |
|---|---|---|---|---|---|
| | | 90% | 95% | 99% | 99.9% |
| MSK H = 1/2 | CONTINUOUS MSK | 0.800 | 0.945 | 1.250 | 3.074 |
| | 64 CHIPS + 4 CHIP RANDOM PHASE TRANSITION | 0.793 | 0.947 | 1.264 | 3.109 |

SIMULATION CONDITIONS: 4 SAMPLES/CHIP, 3072 CHIPS AVERAGED

CONTROL LOGIC OPERATING STATES

PHASE RANDOMIZATION TO REDUCE DETECTABILITY OF PHASE OR FREQUENCY-MODULATED DIGITAL SIGNALS

The Government has rights in this invention pursuant to Contract No. F30602-83-C-0091 awarded by the Department of the Air Force.

This invention relates to randomization of the phase of a transmitted digitally-modulated MSK signal in order to decrease the detectability of the signal to unauthorized receivers.

It is often desirable when transmitting signals modulated onto a carrier through a channel having substantial nonlinearities, as for example a channel including an amplifier subject to compression, to select a modulation method which maintains a constant carrier amplitude. Angle modulation is constant-amplitude modulation, and includes both frequency and phase modulation. The phase modulation techniques may include phase modulation (PM) or phase-shift keying (PSK), quadrature phase shift keying (QPSK) or offset QPSK (OQPSK).

Minimum-shift keying (MSK) is a special case of OQPSK with sinusoidal pulse weighting, and is a form of frequency modulation having a modulation index of 0.5. MSK is an advantageous form of modulation because it is efficient in terms of the ratio of data rate to channel bandwidth (bits/sec/hertz) among those signals which are noncoherently orthogonal. Orthogonal signals are those that do not interfere with one another in the process of detection. For example, in noncoherent FSK signaling using envelope detectors, the two FSK signals at frequencies $F_1$ and $F_2$ are said to be noncoherently orthogonal if, when a tone of $F_1$ is transmitted, the sampled envelope of the output of the receiving filter tuned to $F_2$ is zero, or has no cross talk. The carrier of an MSK-modulated signal is suppressed because there is no actual carrier, and it is therefore not directly available for generating a demodulating carrier.

Because the MSK signal consists of MARK signals at $F_1$ and SPACE signals at $F_2$, it might appear that the frequency spectrum should include strong components at $F_1$ and $F_2$. The carrier signal for a string of symbols (MARK or SPACE) of the same type will in fact add in-phase. However, when the data stream is modulated by random symbols, the starting phase of the carrier for any symbol is established by the ending phase of the carrier for the preceding symbol. Since MSK carrier frequencies $F_1$ and $F_2$ are selected so that during a bit interval an even number of carrier cycles plus (for $F_1$) and minus (for $F_2$) a quarter carrier cycle, the phases of the two carriers rapidly reach conditions of quadrature-phase and out-of-phase carrier bursts, which effectively suppresses the $F_1$ and $F_2$ frequencies.

Many demodulators of signals having a suppressed carrier pass the received signal to a frequency doubling circuit to increase the energy of the doubled-frequency Mark or Space frequency, which allows reconstruction of the carrier, thereby allowing coherent demodulation of the signal with low noise. The frequency-doubling technique is used to recover the carrier of bi-phase modulated signals and of MSK signals, and frequency-quadrupling of the signal is used to extract carrier in the case of quadraphase-modulated signals.

When transmitting signals to an intended receiver, it is often desired to reduce the detectability by an unauthorized interceptor or receiver of the signals so transmitted. This can be accomplished in part by using directive antennas to increase the signal energy directed towards the intended receiver and thereby reduce the amount of energy directed towards the unauthorized interceptors or receivers of the signals. Often, the unauthorized receiver will be more distant from the transmitter than the intended receiver which further reduces the signal at the location of the unauthorized receiver. Consequently, the signal arriving at the unauthorized receiver is very weak. However, unauthorized receivers of communications signals can also use the frequency multiplication technique to reconstruct the carrier which was surpressed by the transmitter in the modulation process. In order to detect the presence of signals and aid in locating their origination source, the interceptor can integrate frequency-doubled signal energy for a much longer period of time than can the authorized receiver, who must extract data from the transmission. If the interceptor were allowed to select his integration time, he might choose to integrate the energy from as many as ten thousand data bits in order to regenerate the carrier. Once the carrier has been reconstructed, the unauthorized interceptor can narrow the processing bandwidth of the receiver significantly in order to reduce noise and residual data modulation products. While the authorized receiver can take a long period of time in which to regenerate the carrier, the period during which signal energy can be integrated is limited if information is to be extracted from the transmitted data. Very often, energy can be integrated over only one data bit interval. This gives the unauthorized receiver an advantage which tends to compensate for the weak signal at his location. It would be very advantageous to communicate between a transmitter and an authorized receiver using a modulation process which reduces the advantage to an unauthorized receiver of integrating for long periods of time to reconstruct the carrier.

SUMMARY OF THE INVENTION

A modulator for information signals angle-modulated onto a carrier includes a first modulator coupled to receive the information signals for modulating the information signals onto the carrier. A second modulator coupled to a pseudorandom generator by a switched coupling arrangement changes the phase of the carrier on a pseudorandom basis when the switch is enabled.

DESCRIPTION OF THE DRAWING

FIG. 2 is an amplitude-versus-frequency plot illustrating the spectral distribution of a signal such as that illustrated in FIG. 1;

FIG. 3 is an amplitude-frequency plot of the spectrum of FIG. 2 after doubling in frequency and filtering with a bandwidth of 10 Hz;

FIG. 11a tabulates certain characteristics of signals of 2400 and 9600 BPS when transmitted according to the invention, and FIG. 11b tabulates differences between continuous MSK and MSK signals when formatted according to the invention;

DESCRIPTION OF THE INVENTION

Figure 1:
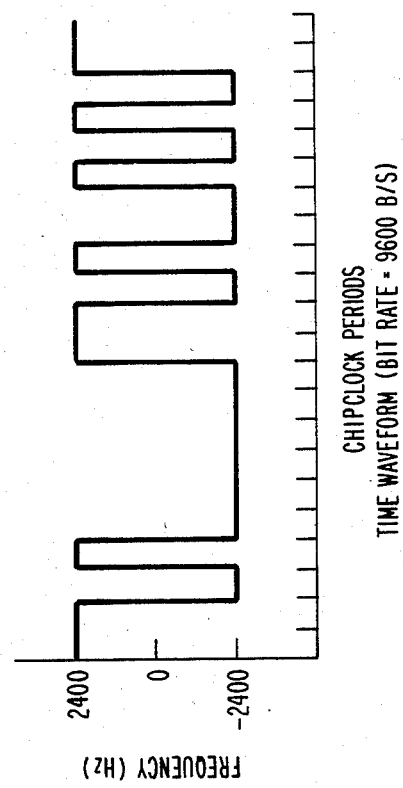
FIG. 1 is a frequency-versus-time plot of an arbitrary information signal.

FIG. 1 illustrates the frequency-versus-time plot of an arbitrary information signal which frequency-modulates a carrier. This may represent a general frequency modulation or MSK modulation. As known, the deviation of an MSK-modulated carrier is equal to half the bit rate, so that if the bit rate of the signal represented in FIG. 1 is 9600 bits/sec (b/s), the total deviation is 9600/2=4800 Hertz (Hz), which is plus or minus 2400 Hz. Thus, each Mark is represented by a frequency of 2400 Hertz above the nominal carrier frequency, and each Space is represented by a carrier 2400 Hertz below the carrier frequency. Since there is no dwell time at the actual carrier frequency, the carrier is suppressed as illustrated in FIG. 2. FIG. 2 is an amplitude spectrum representing the single sided baseband energy distribution of the MSK-modulated signal of FIG. 1. The MSK signal has been translated from the radio frequency (RF) carrier to baseband, thereby causing the negative frequency spectrum to fold over on top of the positive frequency spectrum. As can be seen from FIG. 2, the suppressed carrier, and the location of the carrier are not apparent, as expected. FIG. 3 represents an amplitude-frequency spectrum plot of the energy distribution resulting from frequency-doubling the baseband spectrum illustrated in FIG. 2. As can be seen, the spectrum includes an energy spike occurring at 4800 Hertz, which is twice the deviation of the carrier attributable to a Mark or Space. The amplitude of the spike 310 is so large that very little received energy is required in order to make it clearly visible. Thus, an interceptor can readily identify the presence of a signal and perform further processing in order to extract the carrier.

Figure 4:
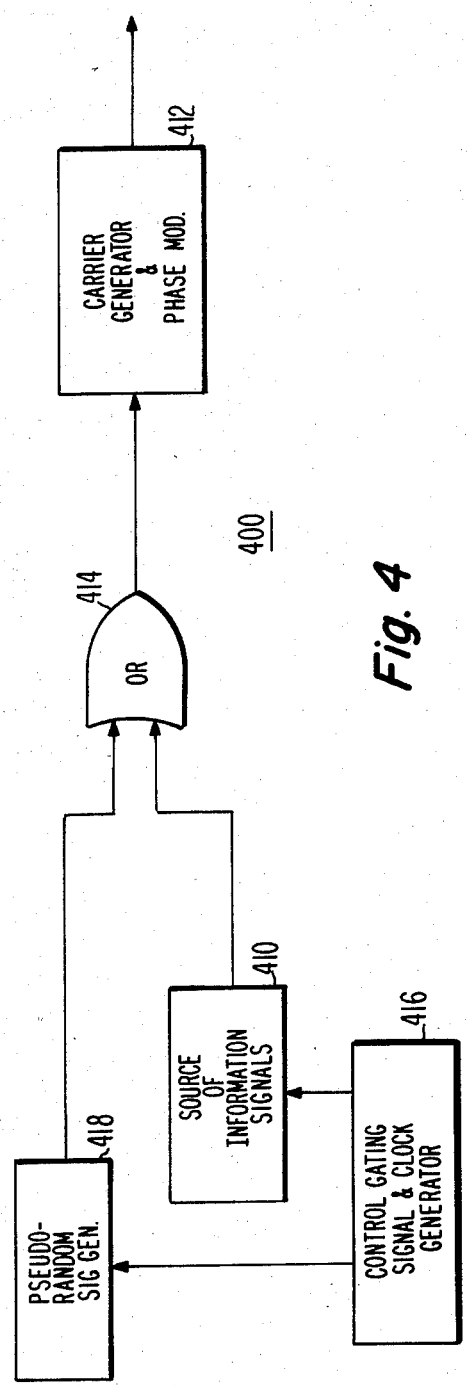
FIG. 4 is a simplified block diagram of a modulator in accordance with the invention.
Figure 5:
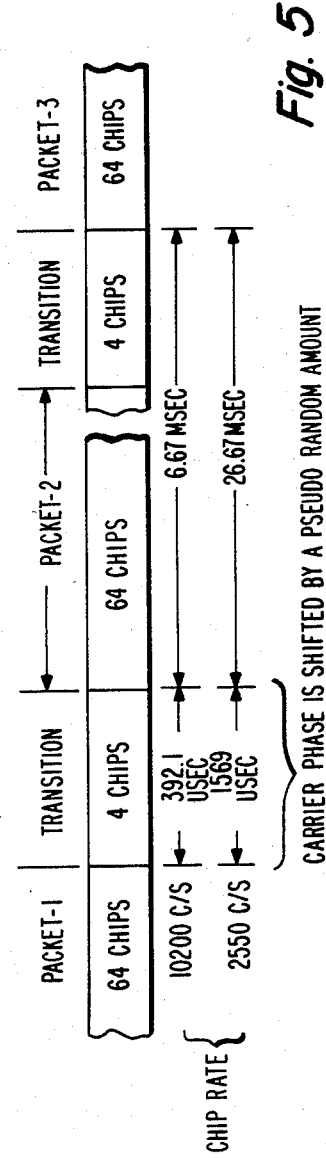
FIG. 5 is a time line describing the state of a signal modulated onto a carrier in accordance with the principles of the invention.

FIG. 4 illustrates in simplified block-diagram form a phase modulator or transmitter 400 according to the invention. In FIG. 4, a source of information signals 410 applies information signals to a carrier generator and phase modulator illustrated as a block 412 by way of an OR gate 414 under the control of gating signals from a control gating signal and clock generator 416. The flow of information signals from source 410 to modulator 412 is periodically interrupted by gating signals from generator 416. During those data-interruption intervals, pseudorandom signals from a generator 418 are applied to modulator 412 by way of OR gate 414. FIG. 5 illustrates a particular format for the arrangement of the information and the pseudorandom bits which might be used in the arrangement of FIG. 4.

It is clear that the arrangement of FIG. 4 processes information bits and pseudorandom bits by time-division multiplexing. In order to maintain a given data rate of information bits, (for example, 9600 bits/sec) under conditions of time-division multiplexing, the transmitted bit rate or chip rate must exceed 9600 b/s. Thus, for a format illustrated in FIG. 5, in which each 64 information bits are multiplexed together with four pseudorandom bits, the chip rate (a chip for this purpose is a transmitted bit) must be 68/64 times the information bit rate. For an information bit rate of 9600 b/s, this corresponds to a chip rate of 10,200 chips/second (c/s). FIG. 5 illustrates the chip format and timing for the multiplexing of 64 information chips occurring during an "active" interval with four pseudorandom chips occurring in a "dead" interval for two information rates, 9600 b/s and 2400 b/s. As illustrated in FIG. 5, each packet or frame of 64 information chips and four pseudorandum chips requires 6.67 milliseconds (msec or MS) at 10,200 c/s rate, and the four pseudorandom chips require 392.1 microseconds (μS or USEC). As also indicated in FIG. 5, the 2400 b/s information rate requires 2550 c/s and requires 26.67 msec for a packet of 64 information chips plus four pseudorandom chips. Thus, a slight increase in chip rate over the basic data rate allows time for randomizing of the phase of the carrier. As will be described, this randomization of the phase of the carrier reduces the effective amplitude of the carrier receivable by an interceptor without materially affecting the signal-to-noise achievable by a intended receiver.

Figure 6:
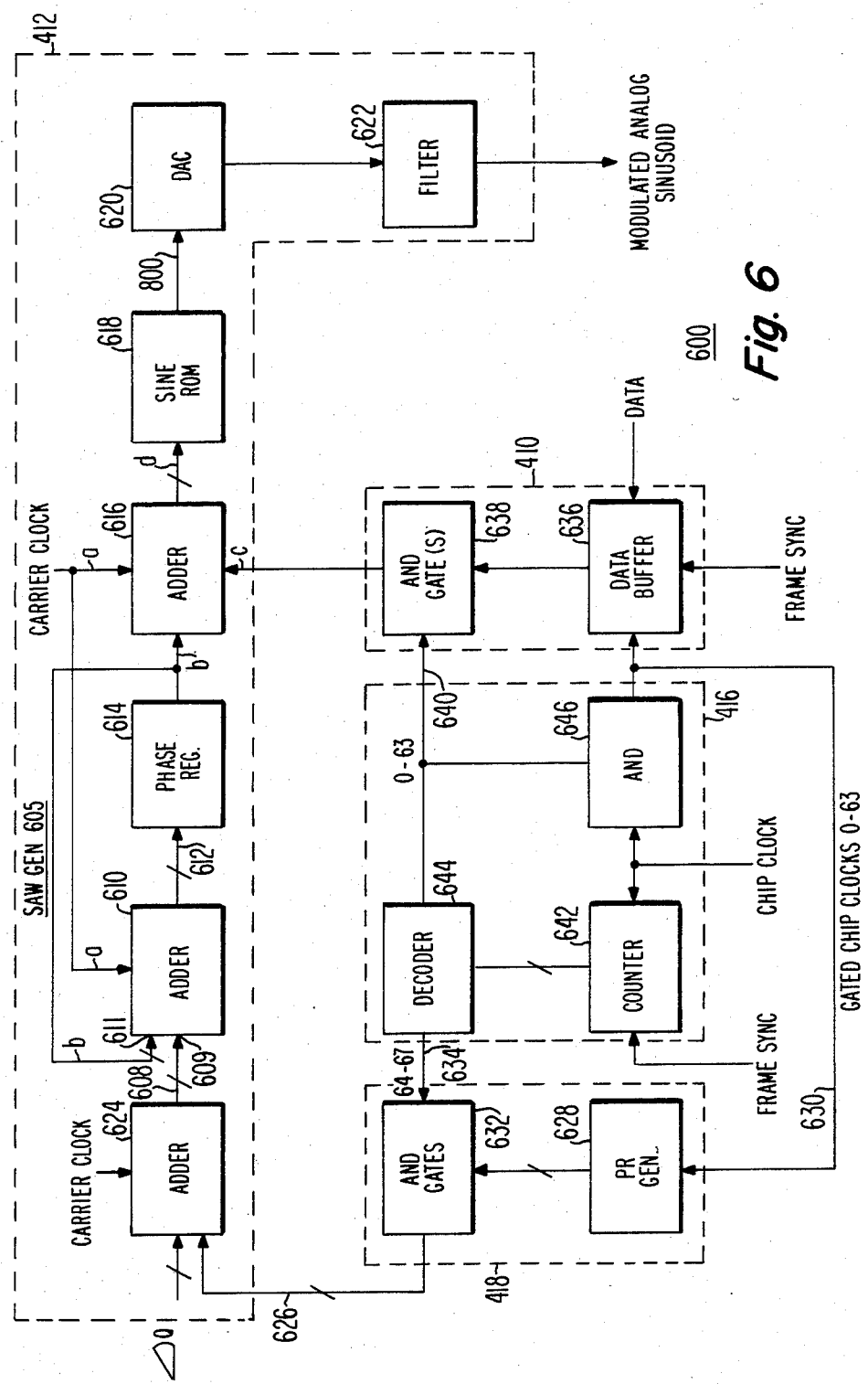
FIG. 6 is a more detailed block diagram of the modulator of FIG. 4 adapted for biphase or quadriphase modulation.

FIG. 6 is a detailed block diagram of a modulator or transmitter for biphase signals in accordance with the invention. In FIG. 6, elements corresponding to the elements of FIG. 4 are designated by the same reference number.

Carrier generator and phase modulator 412 of FIG. 6 is similar to the phase modulator described in U.S. patent application Ser. No. 687,546 filed Dec. 28, 1984, in the name of E. J. Nossen and entitled "DIGITAL MODULATION SYSTEM". The operation of the major portion of modulator 412 can be understood by assuming that a constant digital word is applied over a conductor 608 to an input terminal 609 of an adder 610. Adder 610 is clocked by carrier clock signals applied over a conductor designated a. At each clock cycle, adder 610 adds to the value applied to its input terminal 611 over conductor b the value of the constant word applied to input terminal 609. The resulting sum signal on conductor 612 is applied to a register 614 which stores the signal and applies it over conductor b to an adder 616 and also back to input 611 of adder 610. Adder 610 and register 614 together form an accumulator which increments by the constant word during each clock cycle until register 614 overflows, at which time the signal on conductor b drops to a value near zero and begins to increment once again at each clock cycle. Adder 610 and register 614 thus arranged form what amounts to a digital sawtooth generator, designated generally as 605. The digital sawtooth signal has a recurrence rate which depends upon the carrier clock frequency, the magnitude of the constant digital word applied to terminal 609, and the value at which phase register 614 overflows. For a given carrier clock frequency and register 614 overflow value, the recurrence frequency of the digital sawtooth signal on conductor b can be established by selection of the appropriate value of the constant digital word, because a larger digital word causes more frequent overflow of register 614. The digital sawtooth signal generated at the output of register 614 is applied to adder 616 and is added to a digital information signal applied to adder 616 over conductor c.

Figure 7:
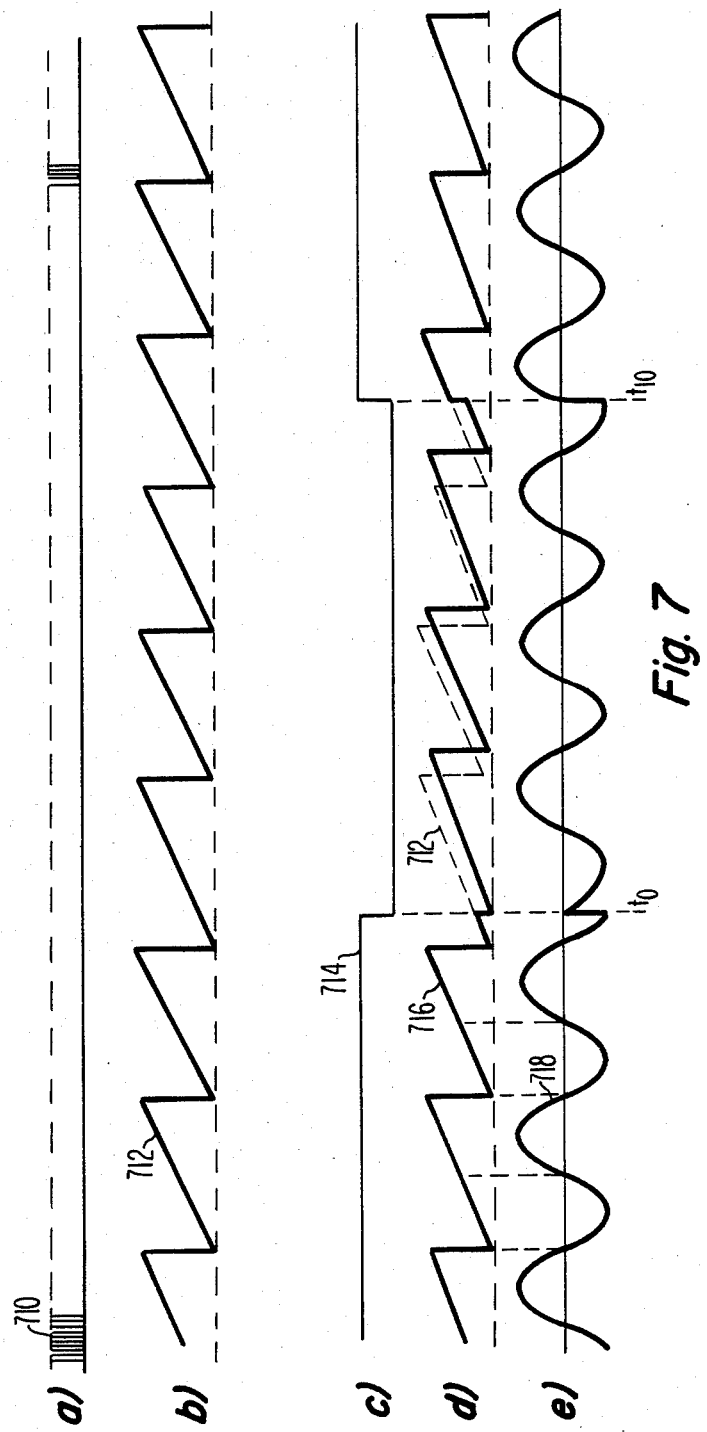
FIGS. 7, 8 and 9 illustrate signals occurring in the modulator of FIG. 6 during operation.
Figure 8:
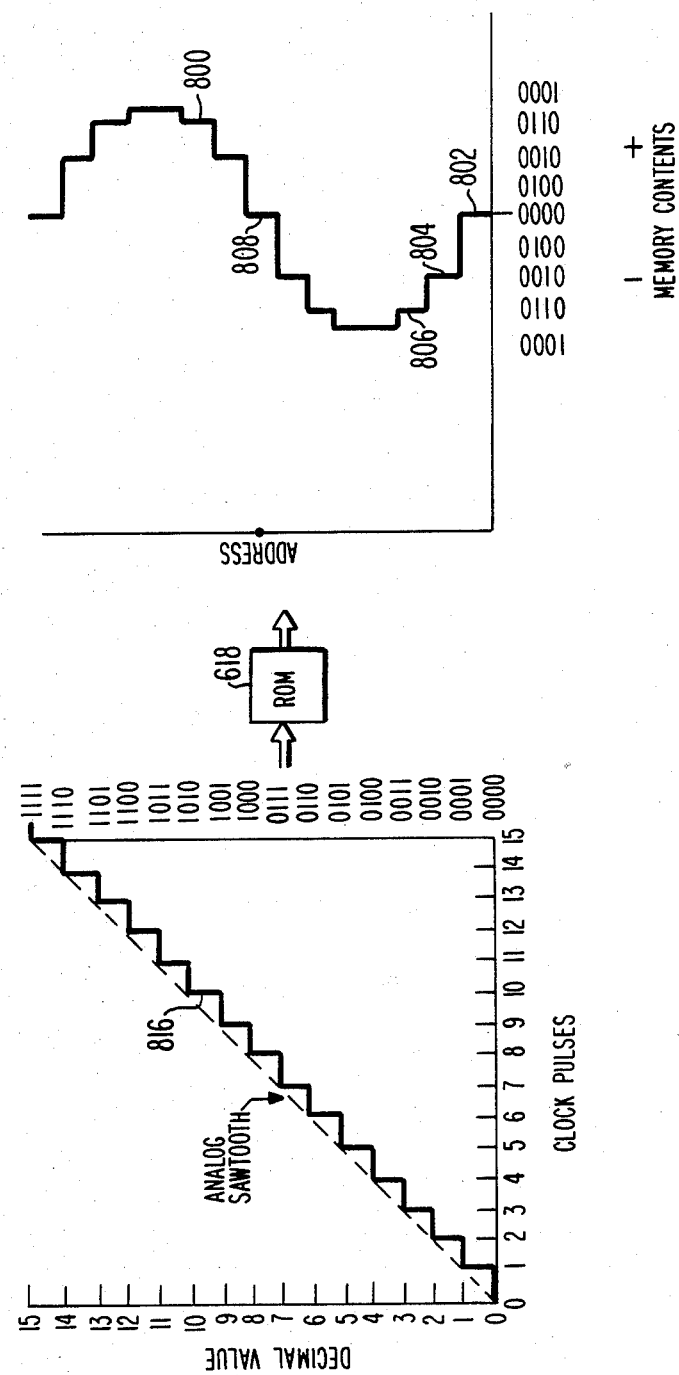

Referring now to FIG. 7, the carrier clock signal on the conductor designated a is illustrated as 710 of FIG. 7a, the digital sawtooth signal applied over conductor b to adder 616 is illustrated as 712 of FIG. 7b, and the information signal applied over conductor c to adder 616 is illustrated as 714 of FIG. 7c. Adder 616 adds together the digital sawtooth 712 and digital information signal 714 to produce a phase-shifted digital sawtooth signal on conductor d illustrated as 716 of FIG. 7d. Adder 616 is set to overflow at or near the same value as phase register 614, so the peak amplitude of the digital sawtooth signal 716 and at the output of adder 616 is phase-shifted rather than changed in amplitude. The phase-shifted sawtooth signal is applied from conductor d to an address input of a sine-programmed ROM or memory 618. Each address of ROM 618 is preprogrammed with a digital word representing a particular portion of a sinusoidal signal. FIG. 8 aids in illustrating this programming.

In FIG. 8, the digital sawtooth waveform on conductor d is represented as a stepped waveform 816 corresponding to a quantized analog sawtooth. The values represented by sawtooth 816 range from 0000 to 1111, and these values when applied in a monotonically-increasing fashion as addresses to ROM 618 sequentially access memories preprogrammed with the values which produce sinusoidal waveform 800. For example, when digital sawtooth waveform 816 has a value of 0000, the memory location accessed produces a digital word illustrated as 802 having a value 0000, representing the starting point of a sinusoid. As the digital sawtooth 816 increases in value, preprogrammed memory values 804, 806 etc. are accessed in sequence, and together represent the first half-cycle of a sinusoid which ends when sawtooth 816 reaches the value 1000, at which time ROM 618 accesses a memory location again producing an output signal 808 having a value 0000, representing the end of the first half-cycle of the sinusoid and the beginning of the second half-cycle. Digital sawtooth 816 continues to increment, thereby accessing in ROM 618 memory locations preprogrammed with values representing the other half-cycle of sinusoid 800. Sinusoidal signal 800 is applied from sine ROM 618 to a digital-to-analog converter (DAC) 620 which produces a quantitized-analog sinusoidal signal having a carrier rate equal to the recurrence rate of the sawtooth signal and phase-modulated according to the information signal. The quantized-analog signal is applied to a filter 622 for elimination of quantizing noise.

Carrier generator and phase modulator 412 as illustrated in FIG. 6 includes a further block 624 which produces on conductor 608 the frequency-controlling input word. While the signal on conductor 608 is called a "frequency"-controlling word, those skilled in the art, recognizing that frequency is the integral of phase, will understand that this word also controls phase. Adder 624 receives from an external source (not illustrated) a frequency-determining word $\Delta\theta$ which is added to a gated pseudorandom signal applied over a conductor 626 from gated pseudorandom signal generator 418. Gated pseudorandom signal generator 418 includes a pseudorandom generator 628 clocked by gated chip clock signals applied over a conductor 630. The resulting pseudorandom signal is applied to AND gates 632 controlled by an ENABLE signal applied over a conductor 634 from gating and clock signal generator 416.

Source 410 of information signals includes a data buffer 636 which receives data from a source (not illustrated), buffers the data and applies it under the control of gated chip clock signals (from generator 416) to an AND gate 638 which is periodically enabled by a signal applied over conductor 640.

Gating and clock signal generator 416 includes a counter 642 which is periodically set, if necessary, by a frame sync signal and which applies the count to a count decoder 644. Decoder 644 decodes the count of 642 to produce a logic HIGH on conductor 640 during clock pulses 0-63 for enabling AND gates 638 and 646 in order to apply chip clock pulses to pseudorandom (PR) generator 628 for advancing the pseudorandom signal and in order to apply chip clock pulses to data buffer 636 for clocking data therefrom to adder 616 by way of enabled AND 638. Decoder 644 decodes counts of 64 to 67 from counter 642 to produce on conductor 634 an ENABLE signal which enables AND gates 632 to couple the pseudorandom signal from generator 628 to adder 624 by way of conductors 626. During counts of 64 to 67 decoder 644 produces a logic LOW on conductor 640 for inhibiting transmission of data by way of gate 638 to adder 616, and also for preventing application of chip clock pulses to clock pseudorandom generator 628. Thus, the pseudorandom signal has a constant value during chip clock pulses 64-67.

Figure 9:
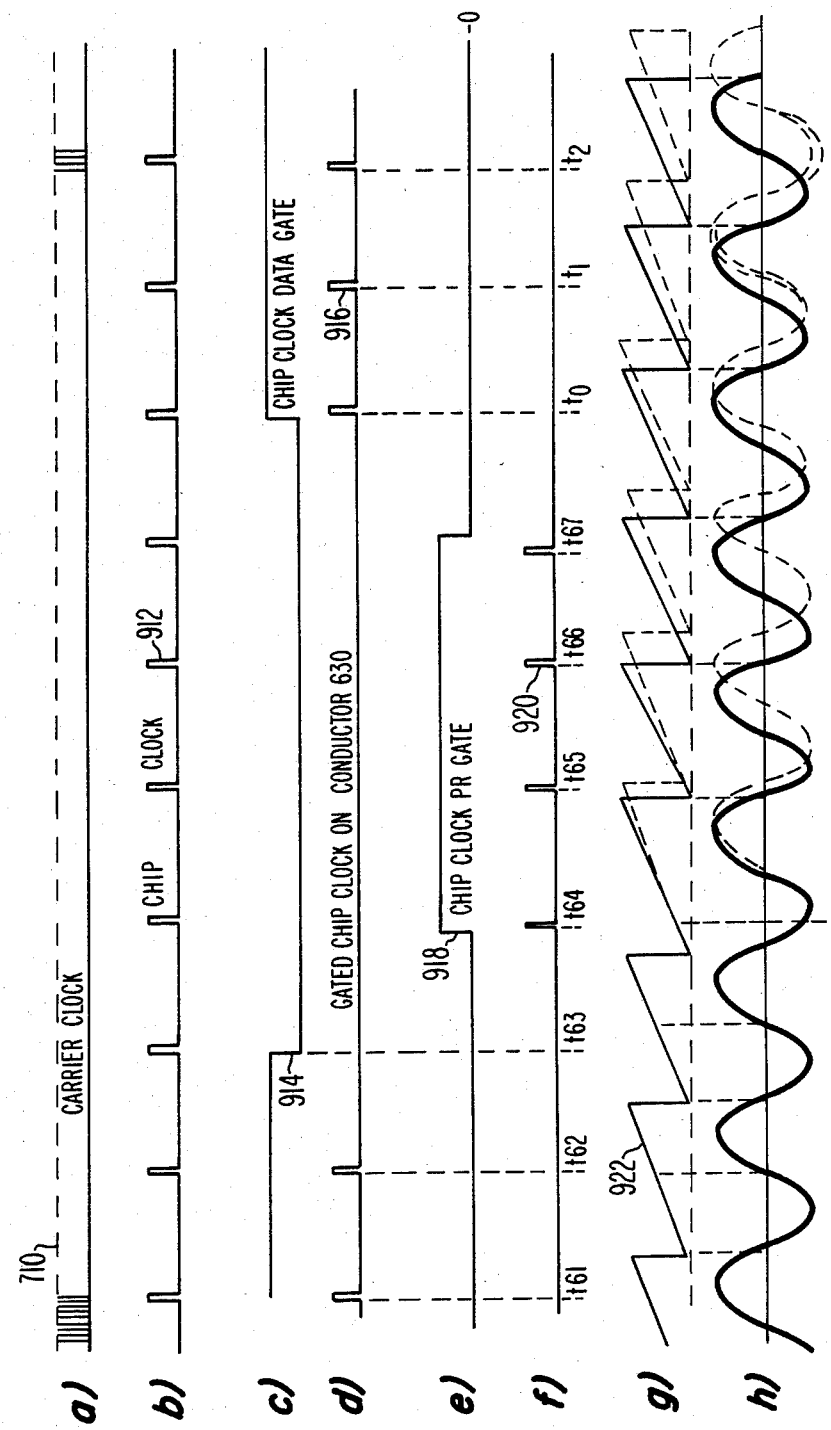

FIG. 9 illustrates the effect of the pseudorandom signal on the analog sinusoid produced by modulator 12. FIG. 9a illustrates carrier clock pulses 710 applied to adder 624 at a rate much higher than the rate of the chip clock pulses 912 of FIG. 9b. Waveform 914 of 9c illustrates the chip clock pulse data gate produced on conductor 640 by decoder 644. As can be seen, the gate is HIGH in the interval prior to $t_{63}$ and then goes low in the interval $t_{63}$-$t_0$ to disable AND gates 638 and AND gate 646 and thereby prevent application of data to adder 616, and to prevent clocking of PR generator 628. Clock pulses 916 gated by data gate 914 are illustrated in FIG. 9d. FIG. 9e illustrates as 918 the chip clock pseudorandom pulse gate applied from decoder 644 to AND gates 632 by way of conductor 634. As can be seen, AND gates 632 are enabled in the interval $t_{64}$-$t_{67}$ for allowing the unclocked or staticized pseudorandom signal to be applied to adder 624. Sawtooth 922 of FIG. 9g illustrates the signal at the output of phase register 614 in response to the PR signal. As illustrated for purposes of clarity, the sawtooth rate (and consequently the carrier rate) is too low relative to the chip clock rate. At times prior to time $t_{64}$ as illustrated in FIG. 9, the PR signal is not applied to adder 624, and therefore the output of adder 624 equals the frequency control word $\Delta\theta$. At time $t_{64}$ a randomly selected value is coupled by AND gates 632 to adder 624. Adder 624 in response produces a sum frequency word which is greater than $\Delta\theta$, and applies the sum frequency word to the input of adder 610. As a result, a larger word is being added by adder 610 at each carrier clock cycle, and therefore accumulation occurs more quickly in the digital sawtooth generator. This is represented in FIG 9g as an increase in slope of the sawtooth 922 in the interval of $t_{64}-t_0$. This results in a progressively increasing advance of phase (an increase of frequency) in the interval $t_{64}-t_0$ over what it would be in the absence of a pseudorandom signal. Chip clock PR gate 918 ends with the lagging edge of the chip clock pulse at time T67. After that time, no further pseudorandom signal is applied to adder 624 over conductor 626 and therefore the output of adder 624 once again becomes $\Delta\theta$. This reduces the accumulation rate after time $t_{67}$ to what it was before time $t_{64}$, and therefore the slope of digital sawtooth 922 returns to the slope which preceded time $t_{64}$. However, because of the increased sawtooth rate in the interval $t_{64}-t_{67}$, a phase advance has occurred which is carried over into the data interval beginning at time $T_0$. Thus, a phase increase by a pseudorandom amount occurs in the interval $t_{64}-t_0$. The pseudorandom signal generator and adder 624 may be arranged so that the maximum phase shift occurring during one chip clock cycle is, for example, 10° whereby the maximum phase-shift occurring during four shift cycles is 40°. In a preferred embodiment of the invention for use with MSK modulation signals, the maximum value of the PR signal is selected to provide 90° of phase shift per chip, for a maximum possible phase-shift of 360° over each 4-chip-clock interval.

Figure 10:
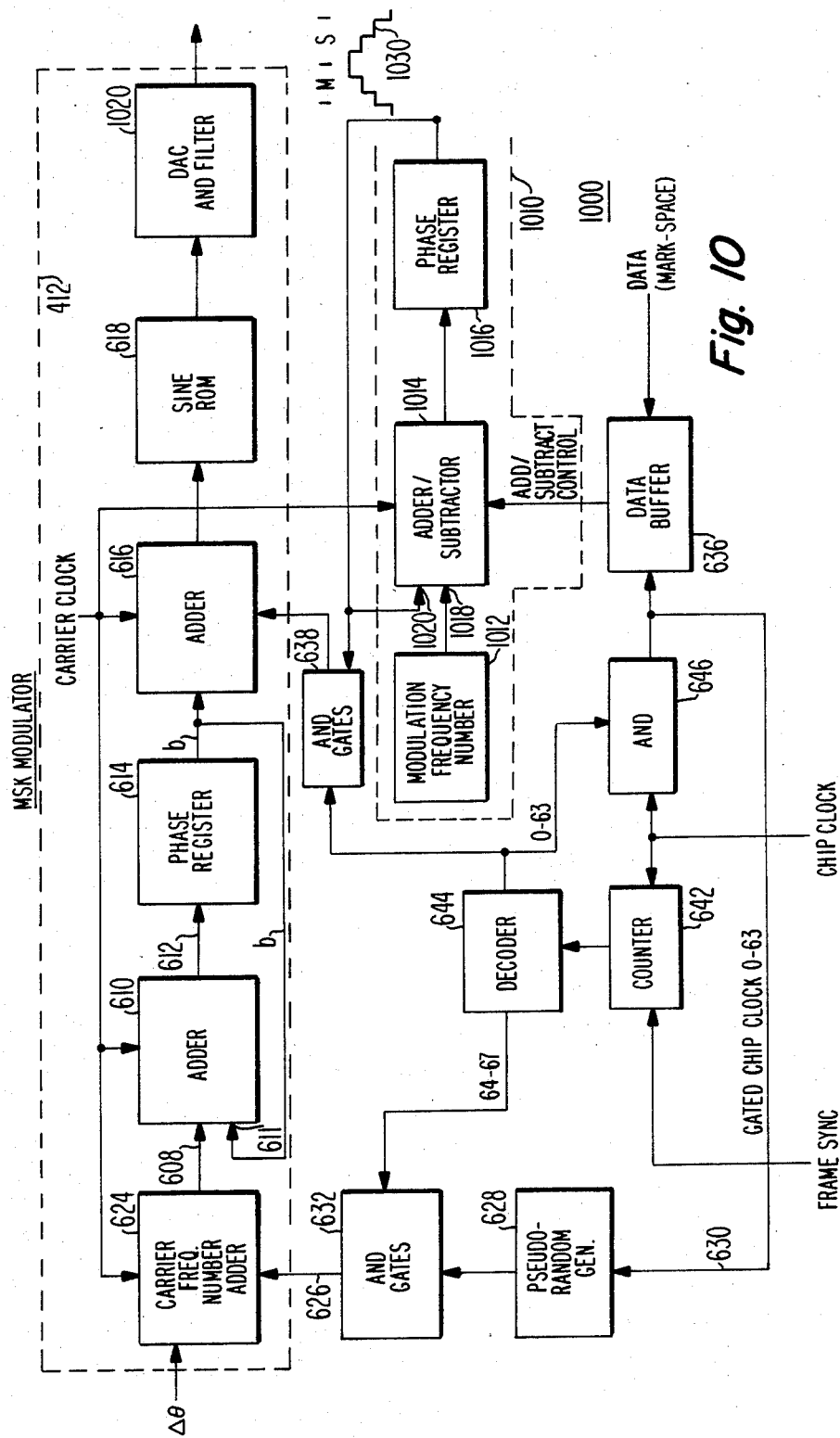
FIG. 10 illustrates in block-diagram form an MSK modulator according to the invention.

MSK modulator 1000 of FIG. 10 includes elements corresponding to those of FIG. 6, which are designated by the same reference numbers. In FIG. 10, carrier generator 412 in conjunction with AND gates 632, PR generator 628 and synchronizing circuits 642, 644 and 646 produces a carrier phase-randomized for intervals corresponding to 4 bit intervals, with the randomizing intervals separated by 64 nonrandomized bit intervals. MSK modulation is accomplished by generating a digital ramp signal in digital ramp generator 1010 which increases monotonically during data MARK intervals and which decreases monotonically during data SPACE intervals (although the opposite convention could be used). The resulting ramp signal is illustrated as 1030 for a MARK followed by a SPACE. The ramp signal from ramp generator 1010 is gated to adder 616 during the 64-bit active interval for generating a linearly increasing phase during MARK intervals and a linearly decreasing phase during SPACE intervals. Linearly increasing or decreasing phase represent a frequency greater or less than, respectively, a reference frequency. The reference frequency is the basic carrier frequency established by the frequency word $\Delta\theta$ applied to generator 412.

Ramp generator 1010 includes a frequency number latch 1012 which establishes the ramp rate. The frequency number is applied to a first input terminal 1018 of a controllable adder/subtractor 1014 which at each clock cycle either adds the frequency number to the signal applied to a second input terminal 1020 or subtracts it therefrom. The added/subtracted signal is applied to a phase register which latches the signal and applies the signal back to input 1020. This arrangement is very similar to sawtooth generator 605 described in conjunction with FIG. 6, with the salient difference being that the modulation ramp rate is much less than the carrier ramp rate.

FIG. 11a tabulates transmission system parameters for 2400 bit/sec and 9600 bit/sec data rates using the aforementioned frame arrangement consisting of 64 active bits and four dead bits. As can be seen, the chip rate is 2550 c/s for 2400 b/s data rate, and the chip rate is 10,200 c/s for a 9600 b/s data rate. This increase in chip rate results in a spreading of the bandwidth of the signal as modulated. In the context of the MSK-modulated signal, it has been found that the spectrum growth is insignificant as illustrated in FIG. 11b, which tabulates the bandwidth efficiency in Hz/chip.

Figure 12A:
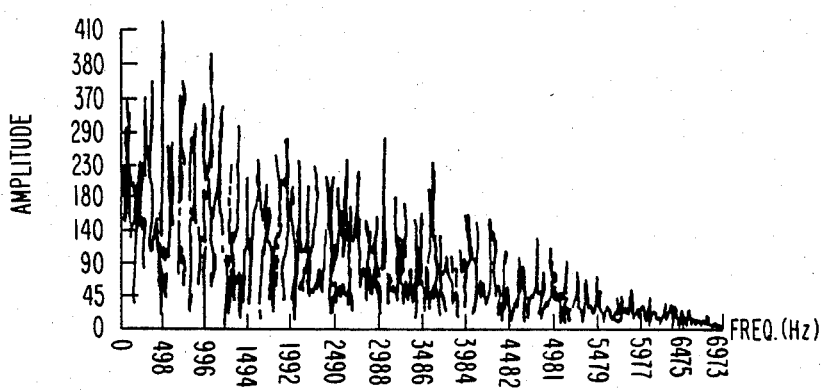
FIG. 12a is a plot of the distribution of amplitude versus frequency of an information signal MSK-modulated in accordance with the invention.
Figure 12B:
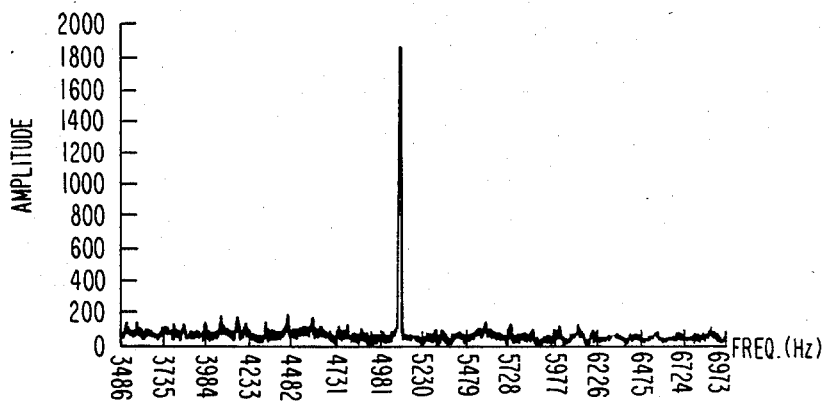
FIG. 12b is an amplitude-frequency spectrum plot of a carrier reconstructed by frequency doubling without the benefit of the invention.
Figure 12C:
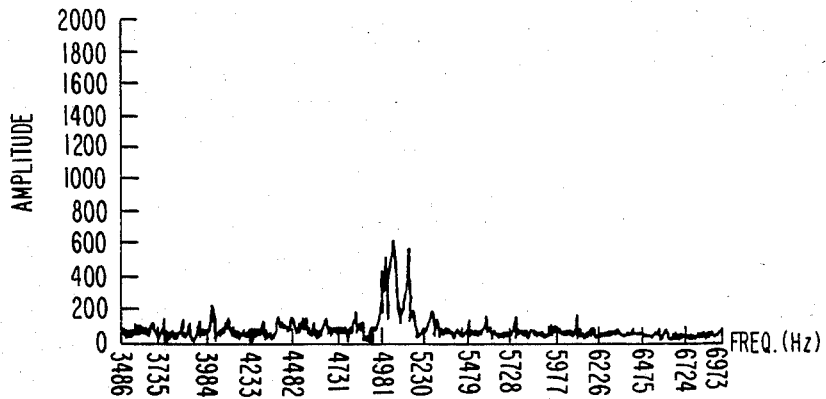
FIG. 12c is a similar amplitude-frequency spectrum plot of the reconstructed carrier when phase randomization according to the invention is used.

FIG. 12a illustrates the spectrum of MSK in a 64/4 frame format, with randomizing of the phase during the 4-bit dead time (9600 b/s data rate, and 10,260 chip rate). FIG. 12b illustrates the frequency-doubled spectrum when the PR generator is turned off, so that there is no phase randomization during the dead time, and FIG. 12c illustrates the frequency-doubled spectrum for the case of phase randomization occurring during the dead time. Note that between FIGS. 12b and 12c, the peak amplitude of the reconstructed carrier component is at least 10 dB lower in the case of randomization of carrier phase, and the bandwidth is significantly greater. The width of the carrier in the case of FIG. 12b depends upon the processing bandwidth of the receiver, (10 Hz in the case shown). However, the width of the carrier in FIG. 12c cannot be affected by the processing bandwidth, but depends instead upon the packet duration and the rate at which the carrier phase is changed. At the 9600 b/s data rate, the carrier phase is changed 9600/64=150 times per second, or at 150 Hz. The null-to-null bandwidth of the reconstructed carrier will lie between 300 Hz (twice 150 Hz for the case of ±180° phase shift) and 150 Hz (for the case of ±90° phase shifts). For phase variations ranging between those values in a uniformly random manner, an average of 225 Hz is expected. The double-sided bandwidth of the carrier has been increased from 20 Hz in FIG. 12b to 225 Hz in FIG. 12c, which is a ratio of 11.25, which corresponds to an amplitude reduction of 10.5 dB.

Figure 13:
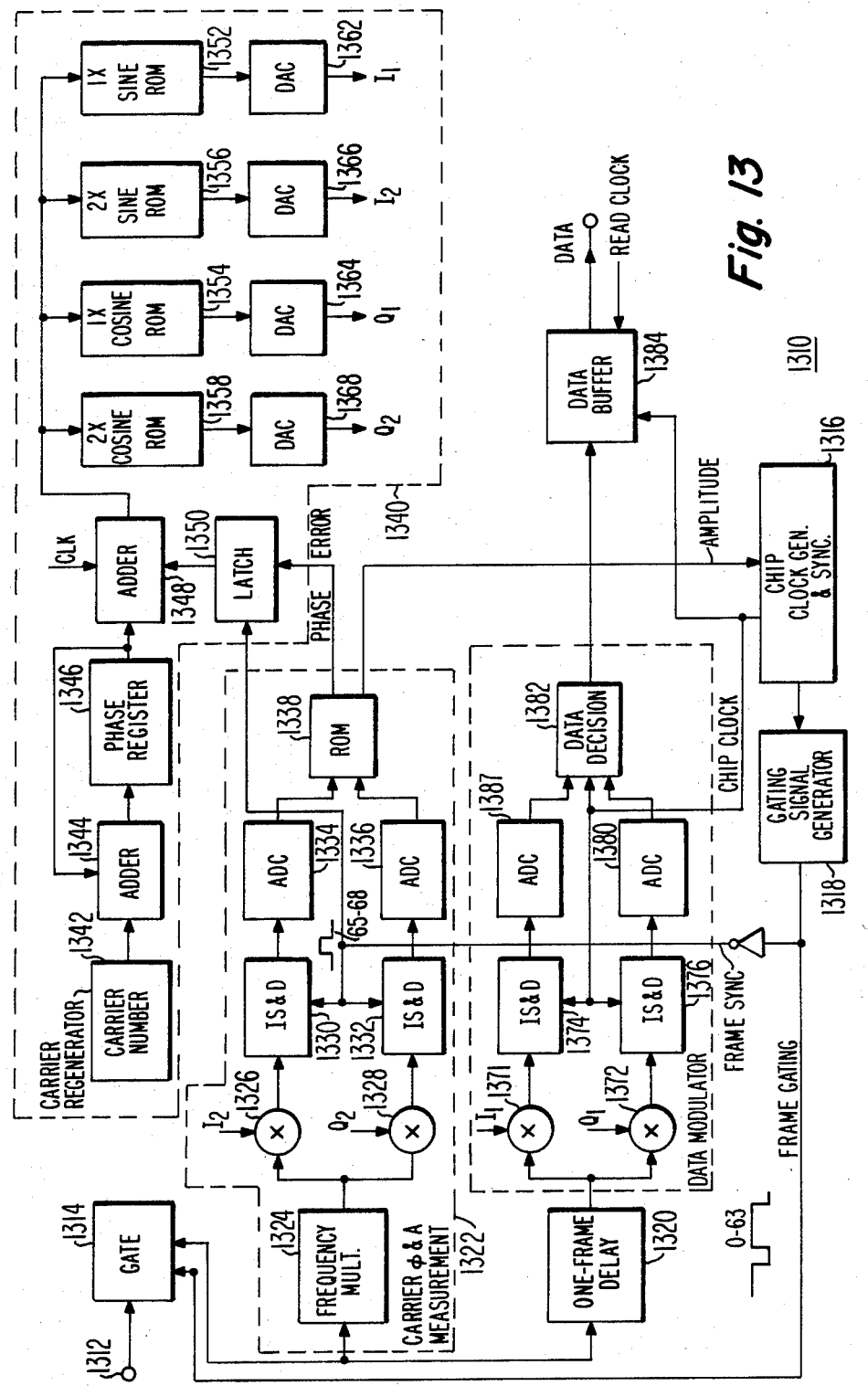
FIG. 13 is a block diagram of a receiver for signals encoded by the modulator of FIG. 4.

FIG. 13 illustrates a receiver designated generally as 1310 adapted for demodulation of data phase-modulated onto a carrier which is periodically phase-randomized according to the format illustrated in FIG. 5. Since only the steady-phase segment of the carrier (the "active" portions) can be used for decoding information, the total signal applied to input terminal 1312 is synchronously gated by a gate 1314 in response to a frame gating pulse in order to allow chips 0–63 of each frame to be applied for demodulation. A chip clock generator 1316 and a gating signal generator 1318 provide the necessary gating, frame synchronization and clock signals once they are synchronized with the incoming signal. The data-carrying segment of the signal passed by gate 1314 is applied to a one-frame delay 1320 and to a carrier phase/amplitude measuring arrangement 1322. Measuring arrangement 1322 includes a frequency multiplier 1324 which, for the case of biphase or MSK modulation, doubles the fequency of the signal. The frequency-multiplied signal from multiplier 1324 is applied simultaneously to multipliers 1326 and 1328, which receive sinusoidal signals at approximately double the carrier frequency ($I_2$) and cosinusoidal signals at double the carrier frequency ($Q_2$), respectively. The double-frequency reference signals convert the frequency-doubled received signal to baseband. The baseband signals at the outputs of multiplier 1326 and 1328 are applied to integrate, sample & dump (IS&D) circuits 1330 and 1332, respectively. The IS&D circuits are dumped by frame sync signals during the "dead" interval, extending from chip clock pulses 63 to 67. During the "active" portion of the next following frame interval, IS&D circuits 1330 and 1332 accumulate the signal. The amplitude of the signal is related to the phase difference between the frequency-doubled carrier and the reference signal applied to a multiplier. For example, if the frequency-doubled sinusoidal carrier $I_2$ applied to multiplier 1326 is in-phase with the frequency doubled carrier of the data, the output signal of multiplier 1326 has maximum magnitude, whereupon IS&D filter 1330 will accumulate the maximum possible output during each frame. At the same time, the double-frequency cosine reference signal $Q_2$ applied to multiplier 1328 must be in phase quadrature with the double-frequency data carrier, and consequently IS&D filter 1332 will accumulate approximately zero amplitude over a frame interval. At the end of each frame interval, the outputs of filters 1330 and 1332 are digitized by analog-to-digital converters (ADC) 1334 and 1336, respectively, and filters 1330 and 1332 have their contents dumped in preparation for the next following accumulation interval. The digitized representations of the accumulation of filters 1330 and 1332 during the frame interval are applied as address inputs to a ROM 1338. The various addresses of ROM 1338 are programmed with the results of two computations:

Amplitude $A = [I^2 + Q^2]^{\frac{1}{2}}$

Phase $\phi = \arctan Q/I$, where I is the output of ADC 1334 and Q is the output of ADC 1336.

For example, if the output of ADC 1334 is 0111 and the output of ADC 1336 is 0000, the particular memory locations thereby addressed include portions preprogrammed to represent an amplitude of decimal seven, and portions preprogrammed to represent a phase of decimal zero. On the other hand, if the addresses of ROM 1338 are 0000 1111, the memory locations thereby addressed are preprogrammed with amplitude=7, phase=90°. When the addresses of ROM 1338 are 0111 0100, the corresponding memory locations are preprogrammed with amplitude of decimal 8 and phase of 30°. The phase information represents the phase error between the double-frequency data carrier and the double-frequency demodulating signal $I_2$. The phase error signal is applied to a carrier regenerator 1340 to generate carrier-frequency data demodulation reference carriers and to generate the double-frequency carriers used in carrier phase and amplitude measurement.

Carrier regenerator 1340 includes a digital sawtooth generator having a carrier number register 1342 and a periodically-overflowing accumulator consisting of an adder 1344 and a phase register 1346 connected with feedback to accumulate the carrier number at each clock cycle until a definite overflow level is reached, as described in conjunction with sawtooth generator 605. The resulting digital sawtooth signal at the carrier frequency is applied to a clocked adder 1348. The phase-indicative signal from ROM 1338 is latched and held for each frame interval by a latch 1350, and the latched word is applied to a second input terminal of adder 1348 to phase-shift the digital sawtooth under control of the phase error signal. The phase-shifted digital sawtooth from adder 1348 is applied as addresses to inputs of a sine ROM 1352 and a cosine ROM 1354, each of which is similar to ROM 618 of FIG. 6. The phase-shifted digital sawtooth is also applied to a double-frequency (2×) sine ROM 1356 and to a 2× cosine ROM 1358.

Figure 14:
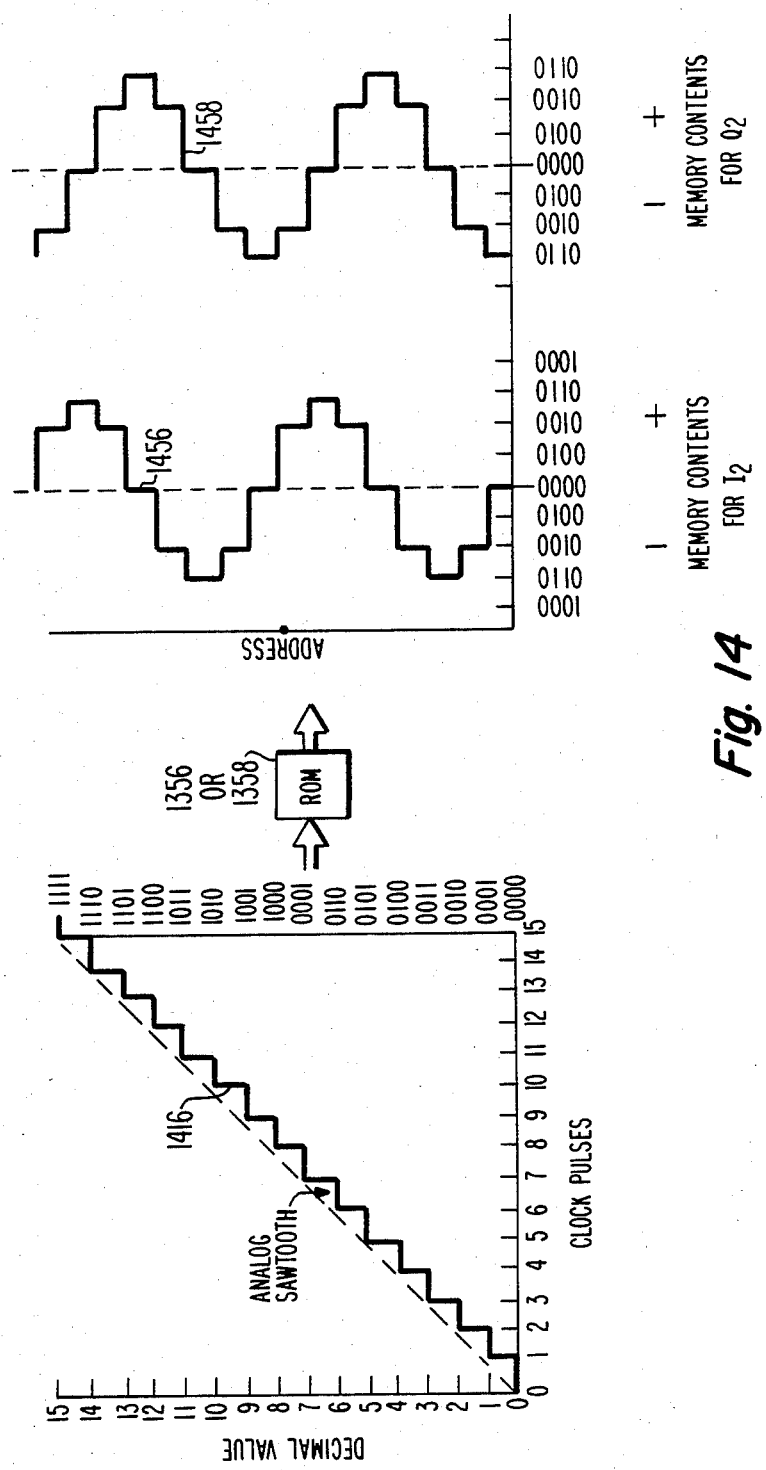
FIG. 14 illustrates memory programming to produce certain signals for the receiver of FIG. 13.

The programming of ROMS 1356 and 1358 to produce double-frequency sine and cosine signals is explained in conjunction with FIG. 14. In FIG. 14, a digital sawooth 1416 applied to ROMS 1356 or 1358 produce signals 1456 or 1458, respectively, which have double the recurrence rate of sawtooth 1416 (and hence are double-frequency) and which are mutually phase-shifted by 90°. As can be seen, signal 1456 begins at zero value, and is therefore a sinusoidal signal, and signal 1458 begins at a maximum value, and hence is cosinusoidal. The outputs of ROMS 1352-1358 are applied to digital-to-analog converters (DAC) 1362-1368 to produce carrier-frequency sine and cosine signals $I_1$ and $Q_1$, and double-frequency sinusoidal and cosinusoidal signals $I_2$ and $Q_2$, respectively. As so far described, carrier phase and amplitude measurement arrangement 1322 and carrier regenerator 1340 produce double-frequency sinusoidal signal $I_2$ in-phase with the double-frequency carrier produced by frequency multiplier 1324. With $I_2$ locked in-phase, the phases of $I_1$, $Q_1$ and $Q_2$ are in known relationship to the data carrier.

Since the phase of the carrier signal is only known after a period of integration, the carrier phase for any particular active interval is only established at the end of the active interval. If the currently received data were to be demodulated by means of the reference demodulating signal established for the previous frame interval, the data error rate would be large, because of the random frame-to-frame phase variation of the transmitted signal. In order to demodulate the data with a demodulating signal having the proper carrier phase, the signal is demodulated by a data demodulator 1370 after being passed through one-frame delay 1320. Data demodulator 1370 is conventional, only the periodic phase changes of the demodulating signals $I_1$ and $Q_1$ applied thereto differ from known art. The signal applied to data demodulator 1370 from delay 1320 is applied simultaneously to the inputs of multipliers 1371 and 1372 to which the $I_1$ and $Q_1$ reference demodulating signals are applied, respectively. The resulting I and Q baseband signals are applied to I and Q channels including IS&D filters 1374 and 1376, respectively, which integrate for a duration of one symbol (in the case of BPSK this corresponds to one bit interval, for QPSK and MSK two bit intervals) and the resulting data is applied to ADCs 1378 and 1380 where they are converted to digital form. The digital signals are applied from ADCs 1378 and 1380 as inputs to a data decision block illustrated as 1382. The data from the output of data decision clock 1382 is applied to a data buffer 1384 and clocked in at the chip clock rate. Data is read from buffer 1384 at the read clock rate.

When receiver 1310 is intended for receiving QPSK-modulated signals, frequency multiplier 1324 is a frequency quadrupler rather than a frequency doubler, and reference signals $I_2$ and $Q_2$ are frequency-quadrupled rather than frequency-doubled signals. When receiving BPSK signals, the output of multiplier 1372 will be essentially zero at all times, eliminating the need for the Q demodulation channel. For QPSK and MSK, the outputs of multipliers 1371 and 1372 are both active, and both I and Q demodulator channels are used.

The described method and the carrier tracking apparatus of receiver 1310 allows for rapid acquisition of carrier and data with very slight loss of information when a transmitter is initially turned on, when it changes to a new frequency, when the signal experiences rapid Doppler changes due to acceleration (as in the case of overhead satellite passes) and as well as for deliberate phase perturbations.

Figure 15:
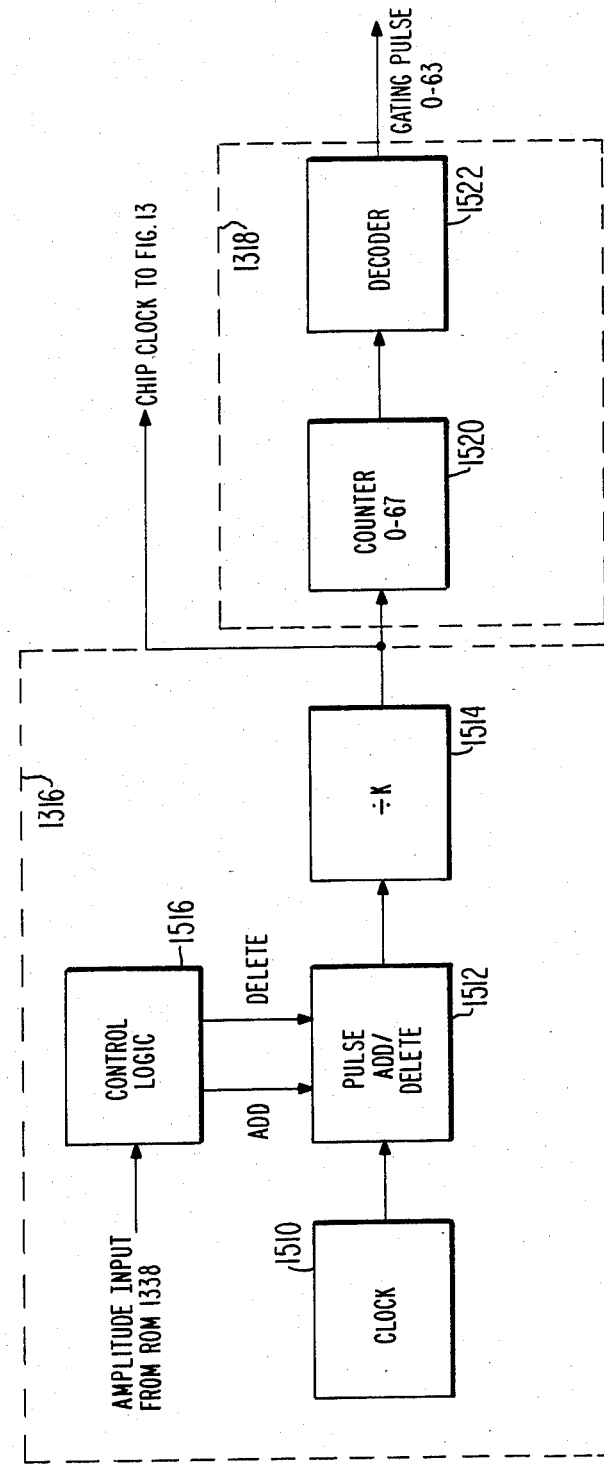
FIG. 15 is a block diagram illustrating details of portions of the receiver of FIG. 13.

Details of chip clock generator and synchronizer 1316 and gating signal generator 1318 of FIG. 13 are illustrated in FIG. 15. Generator 1316 includes a clock generator 1510 driving a pulse adding and deleting circuit (Pulse add/delete) 1512, cascaded with a frequency divider 1514. Frequency divider 1514 typically divides by 16. Pulse add/delete circuit 1512 is controlled by a control logic circuit 1516 which receives an amplitude-representative signal from ROM 1338 (FIG. 13). As mentioned, the amplitude control signal reaches a maximum when the 64-bit-long frame gating pulses are synchronous with the 64 active bits of a single frame. If pulses from clock 1510 were neither added to nor deleted, the rate of clock 1510 would be 16 times the chip clock rate.

The chip clock pulses from generator and synchronizer 1316 are applied to a 0-67 pulse counter 1520 of gating signal generator 1318. The states of counter 1520 corresponding to counts of 0-63 are decoded by a decoder 1522 to produce the frame gating pulse.

Control logic 1516 has one of two command states; it may command that pulse add/delete 1512 add one pulse per frame, or it may command deletion of one pulse per frame. If one pulse per frame is being added, the phase of the gating pulse will progress relative to the received frame signal by 1/16 of a chip clock pulse per frame. If one pulse per frame is deleted, the phase of the frame gating pulse will retard by 1/16 of a chip clock pulse per frame. Naturally, more pulses may be added/deleted per frame to speed up the frame synchronization. Control logic 1516 stores each amplitude signal received from ROM 1338 until the end of the following frame interval, and compares the stored amplitude signal with the newly received value of amplitude signal. If the new amplitude signal is greater than the old one (indicating a greater degree of coincidence of the frame gating pulses with the received frame), control logic 1516 remains in the same operating state, whereby the degree of coincidence may continue to increase. If the new amplitude signal is less than the stored amplitude signal (indicating that correction is in the wrong direction) the state of control logic 1516 reverses, so that an ADD command becomes DELETE and vice versa.

Figure 16:
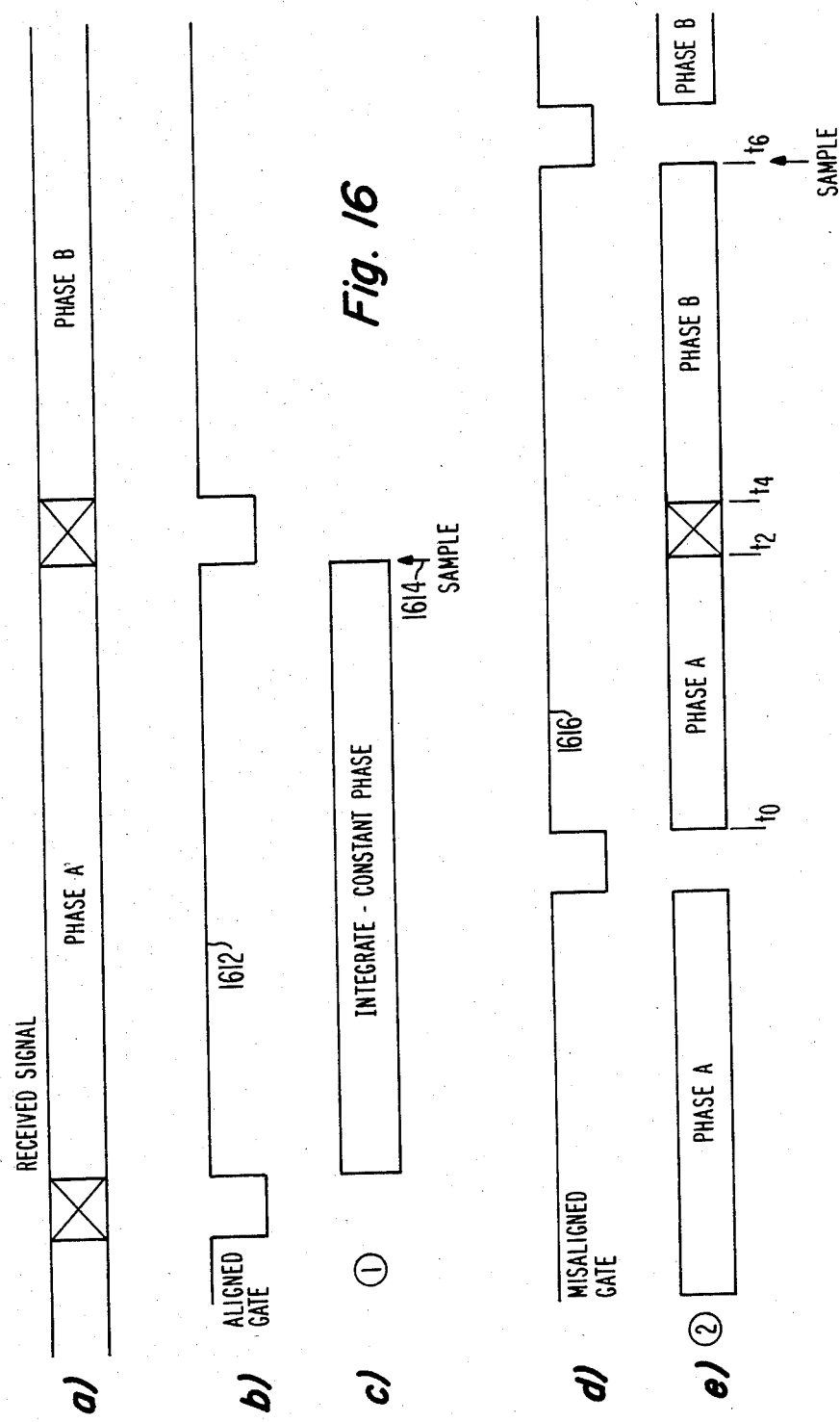
FIG. 16 illustrates as time lines the states of various signals in the receiver of FIG. 13.

FIG. 16a illustrates for reference the state of the received signal as a function of time. FIG. 16b illustrates as 1612 a frame gating signal which is time-synchronous or aligned with the received signal. The sampling time for the amplitude signal is indicated as 1614. A badly misaligned frame gating signal is indicated as 1616 of FIG. 16d, and the corresponding phases of the received signal are indicated in FIG. 16e. During each interval of the misaligned frame gating pulse, both A and B phases are received and processed by carrier phase and amplitude measuring apparatus 1322 by frequency multiplication and integration. During the integration period beginning at time $t_0$ and ending at sample time $t_6$, phase A of the received signal is demodulated with $I_2$ and $Q_2$ at some phase, and produce during interval $t_0-t_2$ an accumulation in IS&D filters 1330 and 1332, and to this accumulation is added another value of accumulation during interval $t_2-t_4$ and interval $t_4-t_6$. Since the accumulations may be relatively positive or negative, depending upon the phase randomization in the interval $t_2-t_4$, the accumulated value at sample time $t_6$ will in general be smaller in both IS&D filters 1330 and 1332 than they would be if framing were correct.

Figure 17:
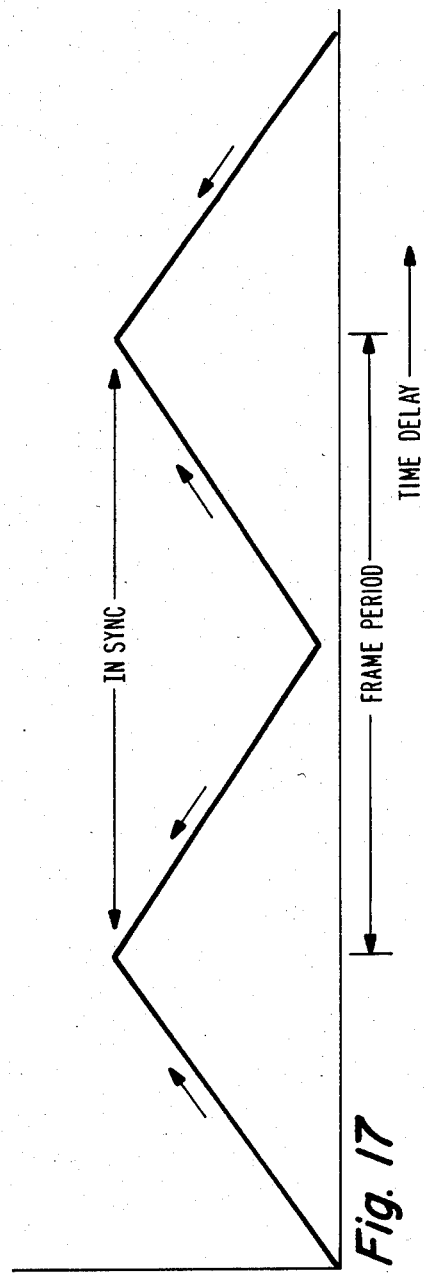
FIG. 17 is a state or locus diagram illustrating the mode of synchronization of the receiver of FIG. 13.
Figure 18:
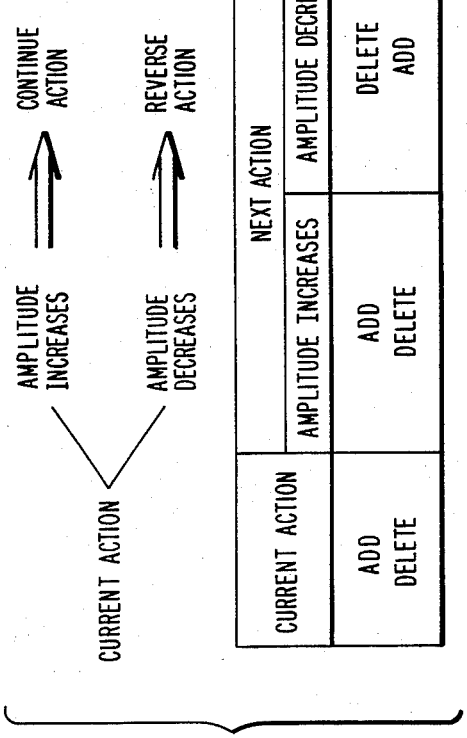
FIG. 18 tabulates the possible states and next action of the control logic of FIG. 15 during operation.

These small values cause ROM 1338 to indicate by the amplitude signal that a frame timing error exists. Control logic 1516 will continually attempt to increase the correspondence of frame gating signal 1616 with the received frame. FIG. 17 illustrates as a locus diagram the framing synchronization action and its relation to the amplitude signal, and FIG. 18 tabulates the two operating states of control logic 1516.

Other embodiments of the invention will be apparent to those skilled in the art. For example, the pseudorandom signal may have both positive and negative values which can be used to vary the phase in both positive and negative directions. The carrier measurement and data demodulation functions may also be carried out entirely in digital form, as by use of digital IS&D's. The frame interval may be varied on a pseudorandom basis at both the transmitter and at the authorized receiver by the use of synchronized pseudorandom generators in order to prevent the unauthorized receiver from discovering the frame interval and processing the signal in the described manner.

What is claimed is:

1. An arrangement for reducing the detectability of an information signal angle-modulated onto a carrier, comprising:
    pseudorandom signal generating means;
    a source of information signals;
    time-division multiplexing means coupled to said pseudorandom signal generating means to said source of information signals for multiplexing said information signals into a first portion of each of recurrent cycles of operation, said first portion having a first predetermined duration, and for multiplexing said pseudorandom signals into a second portion of each of said recurrent cycles of operation separate from said first portion;
    carrier generating and phase modulating means coupled to said time-division multiplexing means for phase-modulating a carrier about a base phase in response to said information signals during said first portions of each cycle, and for pseudorandomly changing said base phase of said carrier in response to said pseudorandom signal during said second portion of each cycle, whereby the phase-modulation of said carrier by said information signal is superposed upon a pseudorandomly changing carrier phase.

2. A carrier phase randomization arrangement for a communications transmitter for transmitting information angle-modulated onto said carrier, said arrangement comprising;
    first adding means for recurrently adding to a sum the value of a first frequency word applied to an input terminal of said first adding means, said first adding means overflowing and resetting to a value near zero value when said sum reaches an overflow value, thereby producing a digital sawtooth signal, said digital sawtooth signal having a recurrence rate established by said frequency word;
    second adding means including a first input terminal coupled to said first adding means for receiving said digital sawtooth signal, and also including a second input terminal coupled for receiving information signals for adding said information signal to said digital sawtooth signal for generating an information-phase-shifted sawtooth signal;

memory means coupled to said second adding means for receiving said information-phase-shifted sawtooth signal for memory location addressing, each said memory location being preprogrammed with a digital word representative of a portion of a sinusoidal signal having said recurrence rate for producing a stream of sinusoid-representative digital words phase-modulated by said information signals;

digital-to-analog conversion means coupled to said memory means for receiving said stream of sinusoid-representative digital words for generating an analog sinusoid phase-modulated by said information signals;

a source of initial frequency word;

pseudorandom signal generating means;

gated frequency word adding means coupled to said source of initial frequency word, to said pseudorandom signal generating means and to said input terminal of said first adding means for coupling to said input terminal of said first adding means as said first frequency word the sum of said initial frequency word and said pseudorandom signal during enabled intervals, and for coupling to said input terminal of said first adding means as said first frequency word said initial frequency word during disabled intervals;

a gated source of digital information coupled to said second input terminal of said second adding means;

clock and gating signal generating means coupled to said gated frequency word adding means, to said pseudorandom signal generating means, and to said gated source of digital information for enabling and clocking said gated source of digital information for applying said digital information to said second adding means, for clocking said pseudorandom signal generating means and for disabling said gated frequency word adding means during a first portion of each cycle of a stream of recurrent cycles, each including first and second portions, whereby said digital information signal angle-modulates said carrier and said pseudorandom signal is advanced, and for disabling said gated source of digital information and enabling said gated frequency word adding means during said second portions of each of said recurrent cycles for adding said advanced pseudorandom signal to said initial frequency word whereby the phase of said carrier is pseudorandomly changed during said second portions of said recurrent cycle.

3. An arrangement according to claim 2 wherein said first adding means comprises:

an adder including first and second input terminals, said first input terminal being coupled to said gated frequency word adding means for receiving said first frequency word therefrom for recurrently adding said first frequency word to a signal applied to said second input terminal to produce an incremented signal;

a register coupled to said adder for receiving said incremented signal therefrom for temporarily storing said incremented signal and for overflowing at a predetermined level for generating said digital sawtooth signal and for feeding said digital sawtooth signal to said second input terminal of said adder for being incremented.

4. An arrangement according to claim 2 wherein said gated frequency word adding means comprises:

an adder including a first input terminal coupled to said source of initial frequency word and also including a second input terminal, and further including an output terminal at which said first frequency word is generated;

a gate including a control input terminal and a controlled signal path, said controlled signal path being coupled to said second input terminal of said adder and to said pseudorandom signal generating means, and said control input terminal being coupled to said clock and gating signal generating means for, when enabled, coupling said pseudorandom signal to said second input terminal of said adder, and for, when disabled, isolating said pseudorandom signal from said adder whereby said adder adds value zero to said initial frequency word to produce said first frequency word.

5. An arrangement according to claim 2 wherein said gated source of digital information comprises:

a clocked data buffer including a clock input terminal coupled to said clock and signal generating means and a digital information output terminal for receiving clock signals therefrom for clocking said digital information from said output terminal in response to clock signals applied to said clock input terminal;

a first gate including a controlled signal path coupled to said second input terminal of said second adding means and to said digital information output terminal of said clocked data buffer, and also including a control input terminal coupled to said clock and gating signal generating means for receiving gating signals therefrom for coupling said digital information to said second adding means during said first portion of each said recurrent cycle, and for decoupling said digital information from said second adding means during said second portion of each said recurrent cycle in response to said gating signals.

6. An arrangement according to claim 2 wherein said clock and gating signal generating means further comprises:

a source of chip clock signals;

counting means coupled to said source of chip clock signals for counting said chip clock signals to produce a count signal;

gating means including a controlled signal path coupled to said source of chip clock signals and to said gated source of digital information, and to said pseudorandom signal generating means, and also including a control input terminal for controlling the flow of said chip clock signals to said gated source of digital information;

decoding means coupled to said counting means and responsive to said count signal for producing first and second gating signals during said first and second portions, respectively, of each said recurrent cycle, and coupled to said gating means, to said gated source of digital information, and to said gated frequency word adding means for coupling said first gating signals to said gated source of digital information for enabling said gated source of digital information during said first portion of each said recurrent cycle stay, and for coupling said first gating signals to said gating means for enabling said controlled signal path of said gating means during said first portion of each of said recurrent cycles for applying said chip clock signals to said gated source of digital information and to said pseudorandom signal generating means for advancing said pseudorandom signal during said first portions of each recurrent cycle, and for preventing application of said chip clock signals to said gated source of digital information and to said pseudorandom signal generating means during said second portion of each recurrent cycle, and for coupling said second gating signals to said gated frequency word adding means for enabling said gated frequency word adding means during said second portion of each recurrent cycle.

7. A modulation arrangement, comprising:
a source of information signals;
a pseudorandom signal generator;
first carrier angle-modulation means coupled to said source of information signal for modulating said information signals onto said carrier;
second carrier phase modulation means; and
switched coupling means coupled to said pseudorandom signal generator and to said second carrier means for, when enabled, pseudorandomly changing the phase of said carrier.

8. A method for reducing the detectability of an information signal angle-modulated onto a carrier, comprising the steps of:
generating information signals;
generating a pseudorandom signal;
time-division multiplexing said information signals and said pseudorandom signals together during first and second portions, respectively, of a recurrent cycle of operation;
phase-modulating a carrier about a base phase in response to said information signals during said first portions of each said recurrent cycle; and
changing said base phase of said carrier in response to said pseudorandom signal during said second portions of each said recurrent cycle.

9. A method according to claim 8 further comprising the steps of:
generating a frame synchronizing signal defining a predetermined frame interval;
generating a data modulation signal defining a predetermined data modulation interval portion of said predetermined frame interval; and
coupling said frame synchronizing signal and said data modulation signal to said time-division multiplexing means for defining the duration of the sum of said first and second portions as said frame interval and for defining said first portion as said data modulation interval.

10. A receiver for received signals modulated onto a carrier the phase of which is randomly changed, comprising:
storage means coupled for storing said received signals for a first interval equal to the time between said phase changes of said carrier for generating delayed data signals;
carrier phase determining means coupled for determining the relative phase of said carrier during said first interval for generating a carrier phase indicative signal;
uncorrected demodulating signal generating means for generating an uncorrected demodulating signal having a recurrence rate equal to the recurrence rate of said carrier;
phase control means coupled to said uncorrected demodulating signal generating means and to said carrier phase determining means for correcting the phase of said uncorrected demodulating signal under the control of said carrier phase indicative signal for generating during a second interval following said first interval a phase-controlled demodulating signal; and
demodulating means coupled to said storage means and to said phase control means for demodulating said delayed data signal by means of said phase-corrected demodulating signal.

11. A receiver according to claim 10 wherein said random phase changes of said carrier occur at a regular frame rate, said first interval is a frame interval, and said second interval is also a frame interval.

12. A receiver according to claim 11 wherein said carrier phase determining means comprises:
frequency multiplication means coupled for frequency-multiplying said received signals to generate frequency-multiplied signals including a frequency-multiplied carrier;
controllable demodulating signal generator means for generating relatively inphase and quadrature components of a first demodulating signal at a frequency equal to that of said frequency-multiplied carrier;
inphase and quadrature multipliers coupled to said demodulating signal generator means for receiving said inphase and quadrature components of said first demodulating signal, respectively, and coupled to said frequency multiplying means for multiplying said frequency multiplied signals for generating inphase and quadrature components of doubled-frequency baseband information, respectively;
signal processing means coupled to said inphase and quadrature multipliers, respectively, for generating said carrier phase indicative signal representative of the phase of said inphase and quadrature components of said first demodulating signal relative to said frequency-multiplied carrier.

13. A receiver according to claim 12 wherein said controllable demodulating signal generator means comprises:
a sawtooth generator for generating a sawtooth signal having a recurrence rate equal to the recurrence rate of said carrier;
adding means coupled to said signal processing means and to said sawtooth generator for adding to said sawtooth signal said carrier phase indicative signal for phase-shifting said sawtooth signal to generate phase-shifted sawtooth signal; and
first memory means coupled to said adding means for being addressed by said phase-shifted sawtooth signal, each memory location of said first memory means being preprogrammed with a portion of said first demodulating signal for generating phase-shifted first demodulating signal in response to said phase-shifted sawtooth signal.

14. A receiver according to claim 13 wherein said uncorrected demodulating signal generating means comprises second memory means, each memory location of which is preprogrammed with a portion of said uncorrected demodulating signal.

15. A receiver according to claim 14 wherein said phase control means comprises addressing means coupled to said second memory means, to said first memory means and to said adding means for addressing said second memory means in synchronism with said first memory means whereby said uncorrected demodulating signal is phase-corrected to produce said phase-corrected demodulating signal.

16. An MSK modulator for digital information signals represented by MARK and SPACE, comprising:

a sawtooth signal generator for generating a sawtooth signal having a recurrence rate equal to the recurrence rate of the suppressed carrier of the MSK-modulated signal to be generated and including a phase control input terminal;

a ramp generator for generating a ramp signal having a predetermined magnitude and a polarity which is positive in response to one of said MARK and SPACE of said information signal and negative in response to the other of said MARK and SPACE;

synchronizing means for generating signals representative of first and second successive portions of recurrent frame intervals;

pseudorandom signal generating means;

adding means including first and second input terminals, said first input terminal being coupled to said sawtooth signal generating means for adding said sawtooth signal to a signal applied to said second input terminal to produce a phase-shifted sawtooth signal;

gating means coupled to said pseudorandom signal generator, said ramp generator, said synchronizing means, to said phase control input terminal of said sawtooth signal generator, and to said second input terminal of said adding means for gating said ramp signal to said adding means during said first portions of said frame intervals for phase-shifting said phase-shifted sawtooth signal in response to said ramp signal during said first portions of said frame intervals, and for gating to said phase control input terminal of said sawtooth signal generator said pseudorandom signal during said second portions of said frame intervals for randomly phase-shifting said sawtooth signals during each of said second portions of said frame intervals; and memory means coupled to said adding means for generating a sinusoidal signal in response to said phase-shifted sawtooth signals.

17. A modulator according to claim 16 wherein said synchronizing means comprises:

a source of chip clock signals;

a source of frame sync signals;

counting means coupled to said source of chip clock signals and to said source of frame sync signals for counting said chip clock signals and for being reset by said frame sync signals;

decoding means coupled to said counting means for decoding the count of said counting means for generating a first count signal having a first duration during said first portion of said frame intervals and for generating a second count signal having a second duration during said second portion of said frame intervals.

18. A modulator according to claim 17 wherein said pseudorandom signal generating means includes a clock input terminal, and further comprising:

clock gating means coupled to said source of chip clock signal, to said clock input terminal of said pseudorandom signal generating means and to said decoding means for gating said chip clock signals to said pseudorandom signal generating means in response to said first count signal for advancing said pseudorandom signal during said first portion of said frame intervals.

19. A modulator according to claim 18 further comprising a data buffer coupled to the source of said digital information signals, to said ramp generator and to said clock gating means for clocking said digital information to said ramp generator only during said first portion of each of said frame intervals.

20. A modulator according to claim 16 wherein said memory means comprises:

addressable digital memory means, each of the memory locations of which is preprogrammed with a portion of a digital sinusoid for generating a digital sinusoid phase-shifted in response to said phase shifted sawtooth signals;

digital-to-analog conversion means coupled to said addressable digital memory means for converting said digital sinusoid into a quantized analog sinusoid; and filter means coupled to said digital-to-analog conversion means for filtering said quantizied analog sinusoid to generate a filtered analog sinusoidal signal.

* * * * *